(12) United States Patent
Nice et al.

(10) Patent No.: US 8,595,491 B2
(45) Date of Patent: Nov. 26, 2013

(54) COMBINING A MOBILE DEVICE AND COMPUTER TO CREATE A SECURE PERSONALIZED ENVIRONMENT

(75) Inventors: Nir Nice, Kfar Veradim (IL); Hen Fitoussi, Tel-Aviv (IL)

(73) Assignee: Microsoft Corporation, Redmond, WA (US)

( * ) Notice: Subject to any disclaimer, the term of this patent is extended or adjusted under 35 U.S.C. 154(b) by 1298 days.

(21) Appl. No.: 12/270,920

(22) Filed: Nov. 14, 2008

(65) Prior Publication Data

US 2010/0125904 A1 May 20, 2010

(51) Int. Cl.
- *H04L 9/32* (2006.01)
- *G06F 7/04* (2006.01)
- *G06F 15/16* (2006.01)
- *G06F 17/30* (2006.01)
- *H04L 29/06* (2006.01)

(52) U.S. Cl.
USPC .......... 713/168; 380/277; 726/5; 726/7; 713/182; 713/187; 713/189; 713/190; 713/193

(58) Field of Classification Search
USPC ................ 713/168, 172; 710/4
See application file for complete search history.

(56) References Cited

U.S. PATENT DOCUMENTS

| | | | |
|---|---|---|---|
| 6,065,120 A | 5/2000 | Laursen et al. | |
| 6,538,880 B1 | 3/2003 | Kamijo et al. | |
| 6,715,131 B2 | 3/2004 | Martin, Jr. et al. | |
| 6,798,647 B2 | 9/2004 | Dickie | |
| 6,968,453 B2 * | 11/2005 | Doyle et al. | 713/168 |
| 7,206,868 B2 * | 4/2007 | Shapiro et al. | 710/14 |
| 2002/0103951 A1 | 8/2002 | Huber et al. | |
| 2003/0065734 A1 | 4/2003 | Ramakesavan | |
| 2003/0126335 A1 | 7/2003 | Silvester | |
| 2004/0034813 A1 | 2/2004 | Chaboud et al. | |
| 2005/0210287 A1 | 9/2005 | Paatero | |
| 2006/0036851 A1 | 2/2006 | DeTreville | |
| 2007/0015499 A1 | 1/2007 | Vikse et al. | |
| 2007/0112944 A1 | 5/2007 | Zapata et al. | |
| 2007/0143629 A1 | 6/2007 | Hardjono et al. | |
| 2007/0255854 A1 | 11/2007 | Khosravy et al. | |
| 2008/0034350 A1 | 2/2008 | Conti | |
| 2008/0165971 A1 | 7/2008 | de Cesare et al. | |

OTHER PUBLICATIONS

Kohno, et al., "New Generation of IP-Phone Enabled Mobile Devices", Retrieved at <<http://www.springerlink.com/content/w433bpdu7neewq87/fulltext.pdf>>, 2002, pp. 319-323.

(Continued)

*Primary Examiner* — Shin-Hon Chen
(74) *Attorney, Agent, or Firm* — Karin L. Williams; Mayer & Williams PC (57) ABSTRACT

A mobile device, such as a mobile phone, smart phone, personal music player, handheld game device, and the like, when operatively combined with a PC, creates a secure and personalized computing platform through configuration of the mobile device's CPU (central processing unit) and OS (operating system) to function as an immutable trusted core. The trusted core in the mobile device verifies the integrity of the PC including, for example, that its drivers, applications, and other software are trusted and unmodified, and thus safe to use without presenting a threat to the integrity of the combined computing platform. The mobile device can further optionally store and transport the user's personalization data—including, for example, the user's desktop, applications, data, certificates, settings, and preferences—which can be accessed by the PC when the devices are combined to thus create a personalized computing environment.

20 Claims, 5 Drawing Sheets

(56) References Cited

OTHER PUBLICATIONS

"Supports TPM 1.2, Microsoft Vista BitLocker, Preboot Authentication, Microsoft FlexGo and UEFI 2.0", Retrieved at <<http://www.phoenix.com/NR/rdonlyres/C672D334-DD93-4926-AC40-EF708B75CD13/0/TrustedCore_SP3b_ds.pdf, pp. 2.

Molnar, et al., "Privacy for RFID Through Trusted Computing", Retrieved at <<http://www.cs.berkeley.edu/~dmolnar/papers/wpes05-camera.pdf>>, WPES 2005, Nov. 7, 2005, Alexandria, Virginia, USA, pp. 4.

"International Search Report", Mailed Date Jun. 10, 2010, Application No. PCT/US2009/062740, Filed Date Oct. 30, 2009, pp. 10.

Extended European Search Report issued Oct. 19, 2012, in connection with corresponding European Patent Application No. 09826556.4 (9 pages).

Garriss, Scott, et al. "Towards Trustworthy Kiosk Computing", Eighth IEEE Workshop on Mobile Computing Systems and Applications, Hotmobile 2007, pp. 41-45 (Mar. 1, 2007).

Garriss, Scott, et al. "Trustworthy and Personalized Computing on Public Kiosks", Jun. 20, 2008, retrieved from the internet, http://www.kiskeya.net/ramon/work/pubs/mobisys08.pdf, retrieved Oct. 5, 2012, 12 pages.

* cited by examiner

COMBINING A MOBILE DEVICE AND COMPUTER TO CREATE A SECURE PERSONALIZED ENVIRONMENT

BACKGROUND

Computing resources such as personal computers ("PCs") in home and office environments are generally secured against attacks and unauthorized access using a variety of effective security techniques and products. However, computer users today frequently travel outside such environments where they often encounter publicly accessible computers such as those located at kiosks, Internet cafes, or hotel lobbies. Providing security is often a significant challenge for these publicly accessible computers and their users risk data loss, downtime, and loss of productivity should the integrity of the computers be compromised.

Traveling corporate users also often have to forgo the benefits that they normally enjoy in their secure corporate environment when using public computing resources. Currently, publicly accessible computers cannot be managed in the same way as a regular corporate asset which can result in application incompatibility issues, unavailability of needed resources, loss of data integrity, and susceptibility to malicious software for the traveling corporate user. The enterprise network itself also becomes vulnerable to attack and risks being compromised if the corporate user brings malware (i.e., malicious software) back to the office, for example, on a storage medium or if the user e-mails compromised or corrupted files from the public computer back to the enterprise servers.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A mobile device, such as a mobile phone, smart phone, personal music player, handheld game device, and the like, when operatively combined with a PC, creates a secure and personalized computing platform through configuration of the mobile device's CPU (central processing unit) and OS (operating system) to function as an immutable trusted core. The trusted core in the mobile device verifies the integrity of the PC including, for example, that its drivers, applications, and other software are trusted and unmodified, and thus safe to use without presenting a threat to the integrity of the combined computing platform. The mobile device can further store and transport the user's personalization data—including, for example, the user's desktop, applications, data, certificates, settings, and preferences—which can be accessed by the PC when the devices are combined to thus create a personalized computing environment. The PC may contribute more substantial computing resources to the combined mobile device and PC computing platform (e.g., a more powerful CPU, additional memory, etc.) while also typically making available peripheral equipment such as large format monitor, full size keyboard, printers, etc.

In an illustrative example, a mobile phone providing a trusted core can be plugged into the PC via a cable or direct docking arrangement to create a powerful combined computing platform. Code in the trusted core will then execute to place the PC on hold by temporarily suspending PC operations. The trusted core provides an independent trusted platform that will take over control of the PC to perform an integrity check of its internal peripheral components to ensure that only unmodified trusted code is executed on the PC. Typically this process for establishing trust will cover all systems on the PC including the BIOS (basic input/output system) code, the OS, and all the application code to verify the PC as trusted. If the PC is verified as trusted, and is thus clean and free from malware, then the user's personalization data can be optionally transferred from the mobile phone and loaded onto the PC to complete the implementation of the combined secure and personalized computing platform. If the check determines that the PC is not clean, then the user's profile and personalization data will not be transferred and loaded. In some cases, the user can be notified of the problem on the PC, be given a chance to remediate it, and then again attempt to create the combined computing platform.

The resulting secure usage environment on the combined mobile device and PC platform can further appear familiar to the user and be consistent in appearance and operation across any available PC. Advantageously, the mobile device's storage functionality can enable the personalization of the usage environment to the user while its trusted core functionality ensures that the environment is protected. The trusted core functions to independently verify the integrity of the platform and thus avoids some of the inherent conflicts encountered with self-assessment. The combined mobile device and PC platform further enables enforcement of enterprise policies for roaming corporate users. In addition, software usage in accordance with license terms can be confirmed for all users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
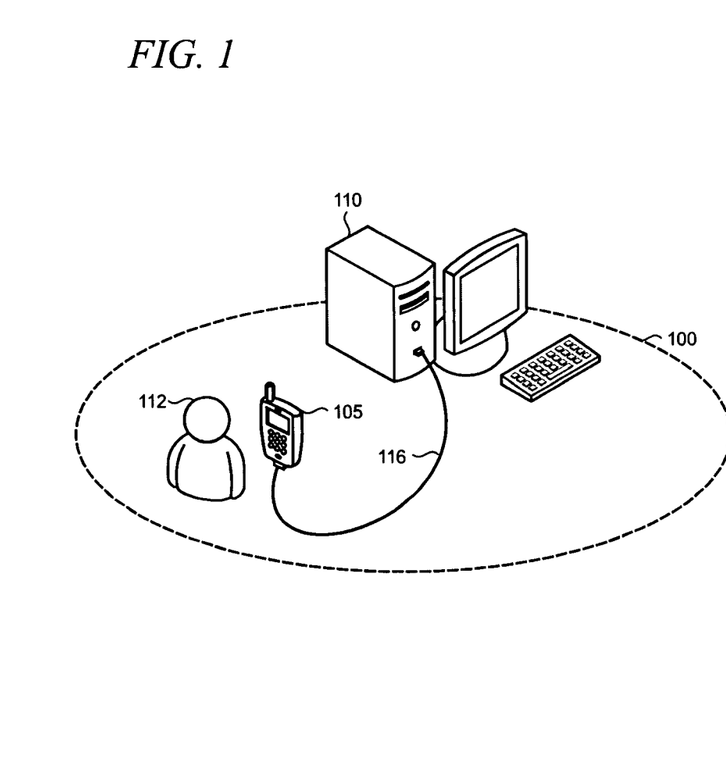
FIG. 1 shows an illustrative mobile device and a PC that may be combined to create a secure personalized environment.

FIG. 1 shows an illustrative computing environment 100 including a mobile device 105 and a PC 110. The mobile device 105 may be selected from one of a variety of different devices including, for example, mobile phones, smart phones, pocket PCs, PDAs (personal digital assistants), personal media players such as MP3 (Moving Pictures Expert Group, MPEG-1, audio layer 3) players, digital cameras, digital recorders, handheld game devices, devices that combine one or more of such functionalities, and the like. Typically, the mobile device 105 will be compact and lightweight to enable it to be conveniently transported by a user 112 from place to place. An onboard power source such as a battery in the mobile device 105 is also typically provided to further enhance the device's utility and functionality.

The PC 110 is representative of computing platforms such as desktop PCs, laptop PCs, workstations, and the like. In this particular example, the computing environment 100 and PC 110 are publicly accessible as might be encountered with computers that are located in hotel lobbies, Internet or cybercafes, public libraries, computer kiosks, and so forth. Publicly accessible computers, while often providing a very convenient and useful service, can expose the user 112 to malware or other malicious activities due to the fact that such computers do not generally provide for the same level of security as in more controlled environments like a home or office.

As shown in FIG. 1, mobile device 105 is operatively coupled to the PC 110 using a connection such as a cable 116 that supports a DMA (direct memory access) connection or similar connection that is configured to enable data transfer from and to the PC's memory independently from the CPU in the PC. Direct docking arrangements that do not require a cable may also be utilized in some cases where the mobile device 105 is configured to be operatively engaged into a corresponding slot or receptacle in the PC 110. Respective connectors disposed in the mobile device 105 and PC 110 may be configured for mateable engagement when the mobile device is docked to enable a signal path to be established therethrough. It is emphasized, however, that the DMA connection described here is intended to be illustrative and that other types of operative coupling mechanisms, methodologies, and protocols may be used to enable the desired interoperability between the mobile device 105 and the PC 110 as may be required to meet the needs of a given implementation.

Figure 2:
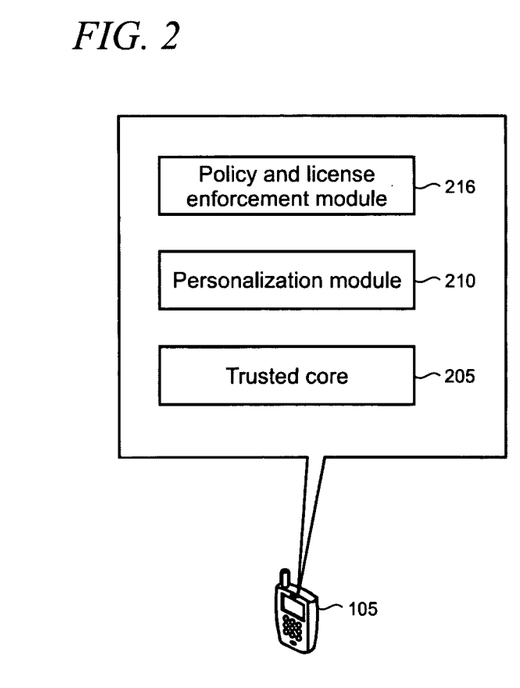
FIG. 2 shows a set of illustrative functional components on the mobile device including a trusted core, a personalization module, and a policy and license enforcement module.

FIG. 2 shows a set of illustrative functional components on the mobile device 105 including a trusted core 205, a personalization module 210, and a policy and license enforcement module 216. It is emphasized that while discrete functional components are shown, in alternative implementations the functionality provided by the components may be distributed in a different manner. For example, functionality may be combined into a given component or split up into different components. As described in more detail below, the trusted core 205, in this illustrative example, is implemented using a combination of hardware and software. Typically, the personalization module 210 and the policy and license enforcement module 216 are implemented using software. However, various combinations of hardware, firmware, and/or software may be utilized to implement the functional modules as may be required to meet the needs of a particular application.

Figure 3:
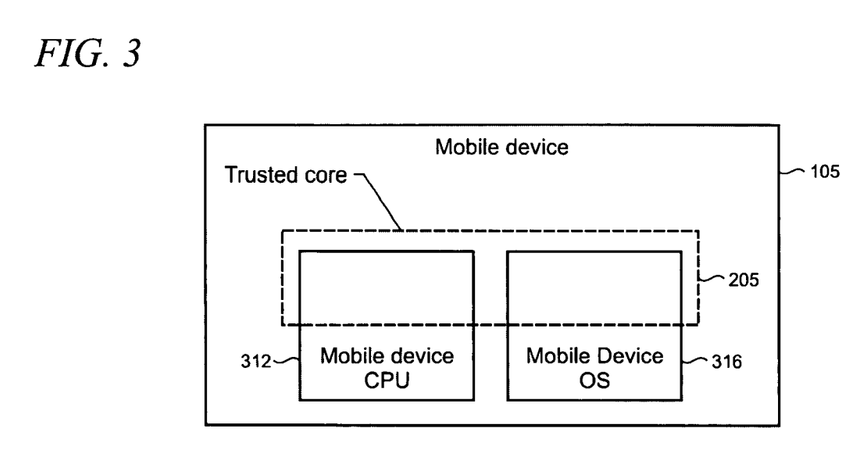
FIGS. 3 and 4 show illustrative implementation details of the trusted core.
Figure 4:
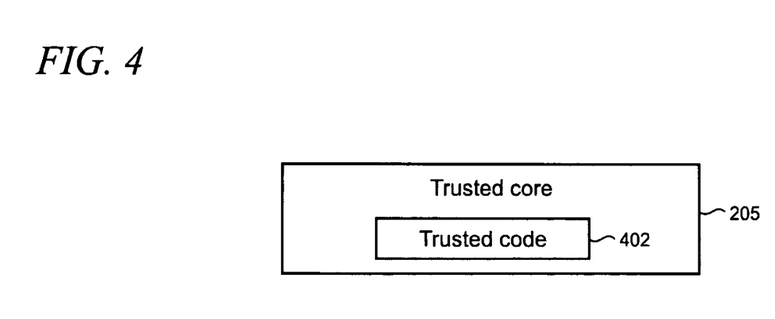

FIGS. 3 and 4 show illustrative implementation details of the trusted core 205 in the mobile device 105. As shown in FIG. 3, the trusted core 205 is implemented in this particular example using a combination of hardware provided by the mobile device CPU (central processing unit) 312 and software provided by the mobile device OS (operating system) 316. This hardware and software combination enables the trusted core 205 to store and then execute trusted code 402, as shown in FIG. 4 in order to place the PC 110 on hold and then perform an integrity check, as described below. The trusted code 402 is immutable (meaning its state can never be modified) and thus provides a base trusted platform that can be used to verify the trustworthiness of the combined mobile device/PC platform when the device 105 is operatively coupled to the PC 110.

Figure 5:
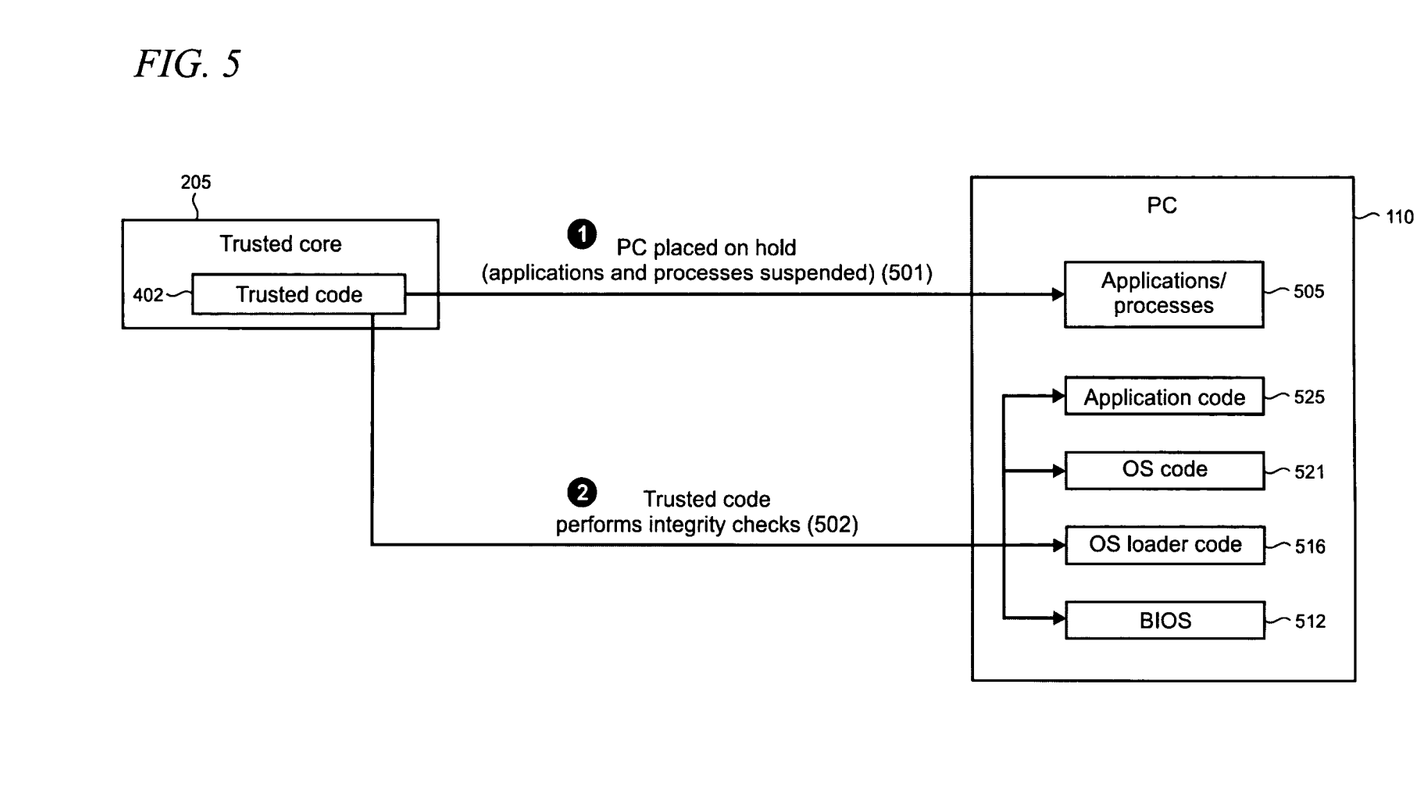
FIG. 5 is a simplified illustrative block diagram that shows the interaction of functional components of the combined mobile device and PC platform.

FIG. 5 is a simplified illustrative block diagram that shows the interaction of functional components of the combined mobile device and PC platform. In accordance with principles of the present arrangement, when the mobile device 105 is operatively coupled to the PC 110, the trusted code 402 in the trusted core 205 will first execute on the mobile device 105 to instruct the PC 110 to suspend its applications and processes 505, and thus enter a state of being on hold (as indicated by reference numeral 501). Typically, the execution of the trusted code 402 will comprise a combination of software and hardware operations in many implementations. Once the PC 110 is on hold, the trusted code 402 will next execute on the mobile device 105 to perform integrity checks of the PC's code (502). The trusted core 205 will take over control of the PC's internal peripheral components such as drives and memory, in order to gain access to the PC's software code to perform the integrity checks.

In this example, the code that is subject to integrity checks by the trusted code 402 includes the BIOS 512 (basic input/output system) that is implemented in firmware, OS loader code 516, OS code 521, and application code 525. However, it is emphasized that the particular types of code shown in FIG. 5 are intended to be illustrative and the particular code on PC 110 that is subject to checks of integrity can vary by implementation. In most applications, all of the code on the PC 110 will be checked for integrity before the PC will be deemed trustworthy.

The integrity checks 502 will each typically comprise the verification that code on the PC 110 is unmodified from its original form and has not been altered, for example, to include malware. Various known integrity measurements can be utilized as may be required to meet the needs of a particular implementation. For example, code on the PC 110 can be subjected to a hashing algorithm and the results compared to the hashes of known good code.

It is noted that code stored on the PC 110 will generally not be executed on the trusted core 205 in many implementations. This restriction is not required in all implementations, but when implemented, may help to keep the mobile device 105 isolated from any malware on the PC 110 to thereby ensure that the integrity of the trusted core 205 is maintained at all times. However, in some applications, the integrity of the trusted core itself may be periodically checked to ensure that is has not been compromised. For example, a trusted entity in an enterprise network with which the user 112 (FIG. 1) may interact while at his regular workplace can be configured to perform an integrity check of the mobile device 105 to ensure that it is healthy by being free from malware and in compliance with applicable corporate policies. In addition, the mobile device 105 may be configured to periodically initiate execution of trusted code to perform a self test to verify its own health.

In some cases, the mobile device 105 can be configured to restrict or limit utilization of the integrity checking feature if the device has not been checked and verified as being healthy within some given time interval. That is, if the integrity of the mobile device 105 has not recently been verified, its ability to perform the integrity check on the PC 110 can be temporarily disabled. This can help to prevent the user from falsely trusting the PC as being secure when in fact it is not.

The isolation of the mobile device 105 further enables it to function as an independent agent for verifying the trustworthiness of the PC 110. Such independence can avoid some of the inherent conflicts associated with self-assessment (or "self-attestation") when a software component essentially checks itself Achieving trustable self-assessment has often proven to be problematic due to the vulnerability of software to modification that can jeopardize trust.

The mobile device 105 may be configured to place the PC 110 on hold and take over control of operations to perform the integrity check at various times. Generally, the mobile device 105 will place the PC 110 on hold and perform the integrity check when it is first operatively coupled to the PC. This could occur, for example, when the user 112 locates a publically accessible PC and wishes to start a computing session in a secure environment. However, the mobile device 105 may periodically place the PC 110 on hold and perform the integrity check during a given computing session. For example, the hold and check could be performed at arbitrary time intervals, or be triggered by the occurrence of an event such as the detection of a security incident (e.g., a virus received at the PC in an e-mail attachment), an attempted remote connection to the user's home or enterprise network, or via a manual initiation by the user 112.

After the trusted core 205 has checked the code on the PC 110 for integrity and deemed the PC 110 trustworthy, then the personalization data for the user 112 may be optionally provided in order to create a secure personalized environment. However, in the event that the PC 110 is not deemed trustworthy then, in some cases, the user 112 can be notified by an alert that is displayed on the mobile device 105 that indicates there is a problem that needs to be addressed. For example, the integrity check may reveal that the PC 110 is missing a needed security patch in an application or in the OS. If the user 112 is able to remediate the problem (e.g., by successfully patching the PC 110), and the integrity check for the problem code is then passed, then the user will be given another opportunity to use the personalization data on the PC 110.

Figure 6:
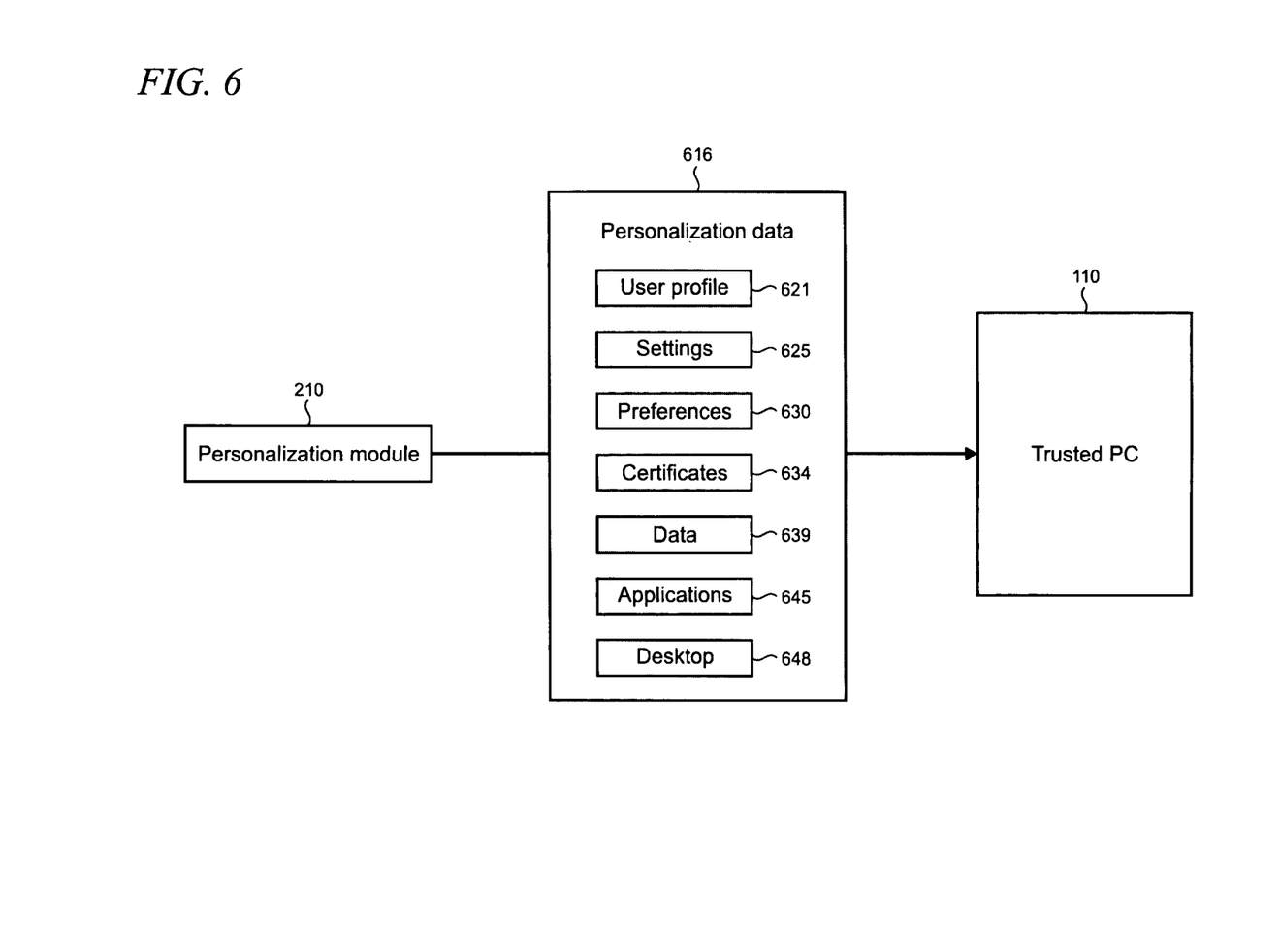
FIG. 6 shows the transfer of illustrative personalization data from the mobile device to the PC.

As shown in FIG. 6, the personalization module 210 can be configured to provide a variety of types of personalization data 616 to the PC 110 once the PC is verified as trusted, or remediated to become trusted. It is emphasized that use of the personalization module 210 and the provision of personalization data is optional. In some cases, it may be desirable to simply provide a secure environment on the PC 110 through the integrity checking described above but not implement a personalized environment for the user by transferring personalization data.

In this particular example, the personalization data 616 may include a user profile 621, settings 625 (including system settings and application settings, for example), user preferences 630, security certificates 634, user data 639, applications 645, and the user's desktop 648. However, these data types are intended to be illustrative and other types and combinations of data may also be used according to the requirements of a given implementation.

In some implementations, the personalization data 616 can be transferred to the PC 110 over the connection 116 (FIG. 1) and stored locally. However, in this case the personalization data 616 will generally need to be deleted from the PC 110 once the user 112 has completed the desired tasks and has ended his computing session in order to maintain the privacy of the user 112. More typically then, the personalization data 616 can continue to reside on the mobile device 105 and simply be accessed by the PC 110 from the mobile device as needed to create the personalized environment on the PC 110. In this case, as the personalization data 616 is not persisted on the PC 110, maintaining the privacy of the user 112 is simplified.

The utilization of the personalization data 616 from the personalization module 210 can create a powerful and personalized platform for the user 112 that can conveniently replicate the experience provided by the user's usual computer. The user 112 needs only to possess the compact and portable mobile device 105 to be able to set up a personalized computing platform on any publicly-accessible computer that replicates the user's familiar desktop environment with all the user's data and applications that are normally used. The PC 110 can also contribute more substantial computing resources to the combined mobile device and PC computing platform (e.g., a more powerful CPU, additional memory, etc.) while also typically making available peripheral equipment such as large format monitor, full size keyboard, printers, etc. But unlike conventional personalization or virtualization solutions, the present arrangement enables the personalized environment to be implemented on a platform that can be verified as being trusted by supporting only unmodified applications and other code.

Figure 7:
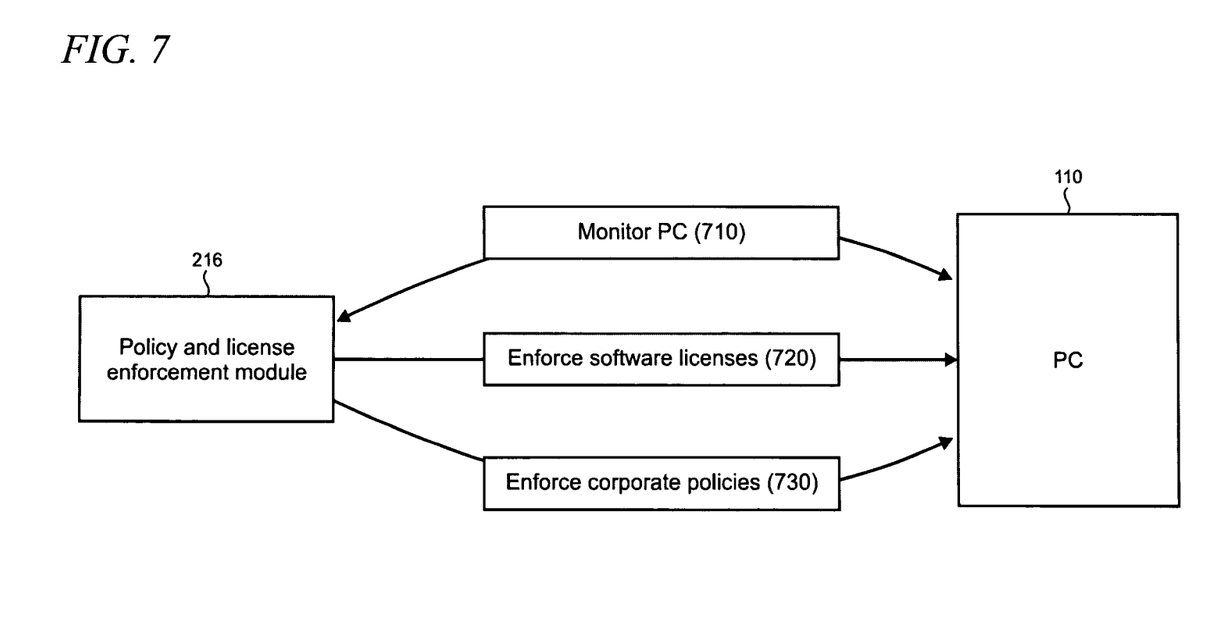
FIG. 7 is an illustrative diagram which shows how corporate policies and/or software license terms may be enforced on the combined mobile device and PC platform.

FIG. 7 shows another optionally utilized feature of the present combined mobile device and PC platform. Here, the policy and license enforcement module 216 on the mobile device 105 is configured to monitor the PC 110 (as indicated by reference numeral 710), enforce applicable software licenses (720), and/or enforce applicable corporate polices (730). While a single module is shown in FIG. 7 as incorporating functionality for implementing both policy and license enforcement, in alternative implementations, separate modules could be used in which the respective policy and license functions are discretely implemented. In addition, either policy enforcement or license enforcement may be used in any given usage scenario, both may be used, or neither may be used, as may be appropriate to meet the needs of the scenario.

The monitoring 710 may comprise the integrity checking as described in the text accompanying FIG. 5 that is performed to verify the integrity of the PC 110. In addition, the PC 110 may be continuously or periodically monitored after it is verified as trustworthy and the user 112 performs tasks on the combined mobile device and PC computing platform.

As the code on the PC 110 is checked for integrity, applications that are subject to license may be verified by the policy and license enforcement module 216 as being legitimately licensed and properly installed on the PC. Applications on the PC 110 that are found to be non-compliant with license terms, for example by being pirated copies or otherwise in violation of applicable license terms, can be temporarily disabled or made unavailable for use by the user 112. In this way the user 112 will not be in violation of license terms by using the non-compliant software. In alternative implementations, if the user 112 is licensed to use an application that is resident on the PC 110, then a certificate or other evidence of such licensed status can be stored on the mobile device 105. The stored certificate can be checked when the mobile device 105 is coupled to the PC 110 to enable legitimate licensed use of the application that might otherwise be non-compliant with applicable license terms.

After the PC 110 is verified as trustworthy and the user 112 is using the secure personalized computing platform formed from the combined mobile device 105 and PC 110, the policy and license enforcement module 216 can monitor activities for the purpose of license enforcement. For example, as applications are launched and used, the policy and license enforcement module 216 can monitor such activity to ensure that only legitimate and trusted code is executed on the PC 110. If untrusted code is attempted to be executed, the policy and enforcement module 216 can initiate efforts to block such execution.

If the user 112 is an employee that is subject to corporate policies, then the policy and license enforcement module can be configured to enforce such polices when the user is using the combined mobile device and PC computing platform. The corporate policies that are applicable to any given usage scenario can vary. They may typically include policies that are intended to improve security in the corporate network, enhance employee productivity, and lower administration costs.

For example, security policies may dictate that IT (information technology) assets (including those used outside the protected perimeter of the corporate network) be compliant with various requirements such as having a firewall that is enabled for all network connections, having anti-virus and spyware applications installed that are updated with the latest signatures, and be current on all security patches. Typically, the policy and license enforcement module 216 will initiate restrictions on network access of the PC 110, for example, to prevent the spread of malware from the PC back to the corporate network (e.g., via an infected file that the user e-mails back to the corporate network).

Employee productivity at the PC 110 (when operated as a secure personalized computing platform) may be enhanced, for example, through enforcement of application usage policy enforcement, web-site filtering, and other commonly utilized techniques. While such techniques can vary by implementation, the policy and license enforcement module 216 may be arranged to monitor application usage on the PC 110 to enforce compliance with applicable policies. In this way, the PC 110 is operated just as any other managed IT asset in the corporate network even though the user 112 is working outside the corporate boundaries.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device adapted for use with a computing platform to create a secure computing environment for a user when operatively coupled thereto, comprising:
   a CPU comprising one or more processors;
   a computer-readable medium containing instructions which, when executed by the one or more processors, implement an OS for the mobile device; and
   a trusted core that is implemented using a portion of the CPU and a portion of the OS, the trusted core being configured for verifying the computing platform's integrity, and further configured to suspend operations on the computing platform and hand control of the computing platform's functionality to the mobile device so that the trusted core can perform verification that executable code that is resident on the computing platform is trusted.

2. The mobile device of claim 1 further comprising a computer-readable medium containing instructions which, when executed by the one or more processors, implement a license enforcement module configured for enforcing license terms that are applicable to software that executes on the computing platform.

3. The mobile device of claim 1 further comprising a computer-readable medium containing instructions which, when executed by the one or more processors, implement a policy enforcement module configured for enforcing policies that are applicable to use of the computing platform by the user.

4. The mobile device of claim 3 in which the policies comprise at least one of security policy, application use policy, productivity policy, or administrative policy.

5. The mobile device of claim 1 in which the verifying comprises checking that code on the computing platform is unmodified and trusted.

6. The mobile device of claim 1 in which the computing platform is one of desktop PC, laptop PC, or workstation.

7. The mobile device of claim 1 further including a computer-readable medium containing instructions which, when executed by the one or more processors, implement a personalization module configured for exposing personalization data to the computing platform to personalize an experience on the computing platform to the user.

8. The mobile device of claim 7 in which the personalization data includes at least one of user profile, settings, user preferences, certificates, data, application, or desktop.

9. The mobile device of claim 1 in which the trusted core executes immutable code.

10. The mobile device of claim 1 further comprising functionality provided by one or more of mobile phone, PDA, smart phone, personal media player, handheld game device, digital camera, digital recorder, or pocket PC.

11. A method for arranging a PC to implement a secure computing environment when operatively coupled to a mobile device, the method comprising the steps of:
   configuring an input to be operatively coupled to one or more functionalities, at least including a trusted core, that are disposed in the mobile device; and
   suspending operations on the PC and handing control of the PC's functionality to the mobile device so that the trusted core can perform verification that executable code that is resident on the PC is trusted.

12. The method of claim 11 including a further step of accessing personalization data from the mobile device to implement a personalized user experience on the PC, the accessing being performed subsequent to verifying that the executable code on the PC is trusted.

13. The method of claim 11 in which the input is operatively coupled to the mobile device using an interface that implements direct access from the mobile device to one or more memory locations on the PC.

14. The method of claim 11 in which the mobile device and PC are each configured so that the mobile device can be directly docked to the PC, the mobile device and PC being operatively coupled when so directly docked.

15. The method of claim 11 in which the performing comprises determining if the executable code is unmodified from its original form or determining that the executable code is free from malware.

16. A method for enforcing policies or license terms on use of a publicly accessible PC, the method comprising the steps of:
   configuring a computer-readable medium with instructions which, when executed by one or more processors disposed in a mobile device, implement a module for enforcing the policies or license terms;
   providing an interface on the mobile device for operatively coupling the module to the PC;
   monitoring the PC from the mobile device, the monitoring comprising either a) checking applications on the PC while the PC is placed on hold during an integrity check performed by a trusted core in the mobile device or b) monitoring PC usage subsequent to the integrity check being completed; and
   enforcing the policies or license terms in response to the monitoring.

17. The method of claim 16 in which the enforcing comprises disabling or making unavailable applications that are non-compliant with the license terms.

18. The method of claim 16 in which the enforcing comprises preventing the PC from making a network connection if the PC is found to be non-compliant with the policies.

19. The method of claim 16 in which the monitoring is performed continuously or periodically.

20. The method of claim 16 including a further step of exposing personalization data to the PC to implement a personalized computing environment on the PC.

* * * * *